(12) United States Patent
Yamamoto

(10) Patent No.: US 6,282,588 B1
(45) Date of Patent: Aug. 28, 2001

(54) DATA TRANSFER METHOD AND DEVICE

(75) Inventor: Yasuyuki Yamamoto, Kanagawa (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/214,084

(22) PCT Filed: Apr. 22, 1998

(86) PCT No.: PCT/JP98/01857

§ 371 Date: Apr. 19, 1999

§ 102(e) Date: Apr. 19, 1999

(87) PCT Pub. No.: WO98/48357

PCT Pub. Date: Oct. 29, 1998

(30) Foreign Application Priority Data

Apr. 22, 1997 (JP) .................................................. 9-104979

(51) Int. Cl.[7] .............................. G06F 13/28; G06F 13/36
(52) U.S. Cl. ................................ 710/27; 710/22; 710/200
(58) Field of Search ................................ 710/22, 23, 27, 710/200

(56) References Cited

U.S. PATENT DOCUMENTS 5,664,223 * 9/1997 Bender et al. .......................... 710/22

FOREIGN PATENT DOCUMENTS

| 5-128049 | 5/1993 | (JP) . |
| 5-173933 | 7/1993 | (JP) . |
| 6-348644 | 12/1994 | (JP) . |

* cited by examiner

Primary Examiner—Thomas Lee
Assistant Examiner—Ilwoo Park
(74) Attorney, Agent, or Firm—Fulwider Patton Lee & Utecht, LLP

(57) ABSTRACT

A first bus 11 and a second bus 12 are connected through a bus repeater 13 having a buffer memory, and DMA (Direct Memory Access) controllers 22, 27 are respectively connected to the buses 11 and 12. The bus repeater 13 can issue DMA request to the respective DMA controllers 22, 27, and these DMA requests can be masked by respective CPUs 1, 6. The DMA controller 22 carries out DMA transfer of data on the bus 11 between the DMA controller 22 and the buffer memory within the bus repeater 13, and the DMA controller 27 carries out DMA transfer between the buffer memory and the bus 12. The CPU 21 masks DMA request of the bus repeater 13 to directly access the buffer, thereby making it possible to check DMA function. Thus, debugging of the system for carrying out DMA transfer through buffer between different buses is easily carried out.

6 Claims, 10 Drawing Sheets

| DATA TRAIN $S_{1A}$ (8BYTE) |
|---|
| DATA TRAIN $S_{1B}$ (8BYTE) |
| DATA TRAIN $S_{1C}$ (16BYTE) |
| DATA TRAIN $S_{2A}$ (8BYTE) |
| DATA TRAIN $S_{2B}$ (8BYTE) |
| DATA TRAIN $S_{2C}$ (16BYTE) |
| DATA TRAIN $S_{3A}$ (8BYTE) |
| DATA TRAIN $S_{3B}$ (8BYTE) |
| DATA TRAIN $S_{3C}$ (16BYTE) |

FIG.6

| DATA TRAIN $S_{1B}$ (8BYTE) |
|---|
| DATA TRAIN $S_{1C}$ (16BYTE) |
| DATA TRAIN $S_{2B}$ (8BYTE) |
| DATA TRAIN $S_{2C}$ (16BYTE) |
| DATA TRAIN $S_{3B}$ (8BYTE) |
| DATA TRAIN $S_{3C}$ (16BYTE) |

FIG.7

| DATA TRAIN $S_{1B}$ (8BYTE) |
|---|
| DATA TRAIN $S_{1C}$ (16BYTE) |
| DATA TRAIN $S_{1D}$ (12BYTE) |
| DATA TRAIN $S_{2B}$ (8BYTE) |
| DATA TRAIN $S_{2C}$ (16BYTE) |
| DATA TRAIN $S_{2D}$ (12BYTE) |
| DATA TRAIN $S_{3B}$ (8BYTE) |
| DATA TRAIN $S_{3C}$ (16BYTE) |
| DATA TRAIN $S_{3D}$ (12BYTE) |

| 127 | 64 63 | 60 59 | 58 57 | 47 46 | 16 15 14 | 0 |
|---|---|---|---|---|---|---|
| REGS (max16) | NREG | FLG | PRIM | P R E | — | E O P | NLOOP |

FIG. 12

DATA TRANSFER METHOD AND DEVICE

TECHNICAL FIELD

This invention relates to a data transfer method and a data transfer apparatus for transferring data between devices or memories respectively connected to two different buses, and more particularly to a data transfer method and a data transfer apparatus for carrying out diagnosis as to whether or not data transfer normally functions.

BACKGROUND ART

Hitherto, there has been known a system in which different buses such as main bus and sub bus are connected through a bus repeater such as gateway, etc. to carry out DMA transfer of data between these buses by DMA (Direct Memory Access) controller provided in the main bus.

For example, in the configuration as shown in FIG. 1, a main bus 101 and a sub bus 102 are both connected to a bus repeater 103 such as bus gateway, etc. A device 104 such as CPU or various interfaces, etc. and a DMA controller 105 are connected to the main bus 101, and a device 106 and a memory 107 such as ROM, etc. are connected to the sub bus 102.

In the example of FIG. 1, the DMA controller 105 on the main bus 101 also controls the sub bus 102 through the bus repeater 103 to thereby realize DMA transfer, e.g., between the device 104 and the device 106. As stated above, if access times of respective buses are the same order even between different buses 101, 102, efficient data transfer can be carried out without useless wait (standby) time.

Meanwhile, in the case where different buses coexist within one system, there are many instances where bus widths and/or data access speeds are different. For example, in the example of FIG. 1, the main bus 101 has bus width of 32 bits and high data access speed and the sub bus 102 has bus width of 16 bits and low data access speed.

In the case where DMA transfer is caused to be carried out between buses in which bus widths and/or data access speeds are different, there is the drawback that useless wait (standby) time is caused to take place on the high speed bus, e.g., the main bus 101 of FIG. 1.

In view of the above, it is conceivable to connect two different buses through buffer memory to carry out DMA transfer through this buffer memory. In this case, when attempt is made to carry out diagnosis as to whether or not DMA transfer normally functions, it is required to allow CPUs of respective buses to run in debugging mode. This is troublesome.

Moreover, in the case where data transfer has not been normally carried out, since it is considered that there is any defect in CPUs of both buses or diagnostic program, there are many instances where finding of the cause becomes very difficult.

Particularly, in the case where CPU or DMA controller, etc. is provided within one LSI, it takes long development time, and schedule of diagnosis, etc. becomes great problem.

Before LSI is designed or is trially manufactured in practice, software simulation including peripheral equipment is carried out to confirm functions as many as possible. However, because it takes much time in simulation, sufficient verification cannot be carried out and there are actual circumstances where it is required to examine closely the problems in short time after trially manufactured LSI, etc. is made up. Thus, there are many instances where difficulty of debugging as described above results in hindrance of development of product.

Further, in the case where data transfer is carried out between devices, there are arrangements of data convenient for respective devices. To cope with this, it is necessary to round down extra data, or to insert another data into the portion between data trains which have been transferred.

When CPU attempts to carry out an operation as described above with respect to data train developed on the memory, it once reads such data train into the register of the CPU thereafter to have to write it for a second time. For this reason, efficiency is very poor (low). This reduces the time required when CPU attempts to carry out other work, and is not therefore preferable.

Here, it is conceivable that DMA controller changes every time transfer source address or transfer destination address at the time of data transfer. In this case, address of transfer source and list of transfer quantity are prepared and DMA controller carries out DMA transfer in accordance with that list every time. However, CPU must prepare transfer specification table. As a result, there is the difficulty that overhead for checking transfer specification every time takes place, etc.

Moreover, in the case where different buses coexist within one system as described above, there are many instances where bus widths are different. For example, in the example of FIG. 1, the main bus 101 has bus width of 32 bits and high data access speed and the sub bus 102 has bus width of 16 bits and low data access speed. Also in the case where DMA transfer is caused to be carried out between buses where bus widths are different as stated above, there are instances where extra data is rounded down or another data is inserted into the portion between data trains which have been transferred. Also in this case, it is desirable that change of data structure or delimit of address can be carried out with ease.

DISCLOSURE OF THE INVENTION

This invention has been made in view of such actual circumstances, and its object is to provide a data transfer method and a data transfer apparatus which are capable of easily carrying out DMA transfer function between different two buses, and capable of specifying portion of the question in short time.

Moreover, another object of this invention is to provide a data transfer method and a data transfer apparatus which are capable of changing, in data transfer between different two buses, size of transfer data block with ease without giving burden on CPU, thus to realize improvement in the working efficiency.

Namely, in order to solve the above-described problems, this invention includes a first bus and a second bus, bus repeating means having buffer memory connected to both the first and second buses, first DMA (Direct Memory Access) control means connected to the first bus, and first data processing means (CPU) connected to the first bus, wherein the bus repeating means has a function to issue DMA request to the first DMA control means and a function to mask this DMA request by the first data processing means to mask the DMA request of the bus repeating means by the first data processing means to directly access the buffer memory within the bus repeating means.

In this case, it is mentioned that second DMA (Direct Memory Access) control means and second data processing means (CPU) are connected to the second bus, the first and second DMA control means carry out read/write operation of data with respect to buffer memory within the bus repeating means to thereby carry out data transfer between the first and second buses, the bus repeating means has a function to issue DMA request to the second DMA control means and a function to mask this DMA request by the second data processing means to mask DMA request of the bus repeating means by the second data processing means to directly access the buffer memory within the bus repeating means.

In this case, it is mentioned that DMA request on the other bus in the bus repeater is masked by one of the first and second data processing means (CPUs) to access the buffer memory within the bus repeater from on the other bus.

Moreover, this invention is characterized in that first and second buses different from each other are connected through bus repeating means having a buffer memory, first DMA (Direct Memory Access) control means is connected to the first bus, and second DMA control means is connected to the second bus to carry out DMA transfer between memory or device connected to the first bus and memory or device connected to the second bus through the buffer memory by these first and second DMA control means, and to mask, by data processing means (CPU), DMA request to the first or second DMA control means from the bus repeating means to directly access the buffer memory within the bus repeating means by the data processing means.

In this case, it is mentioned that first data processing means is provided at the first bus and second data processing means is provided at the second bus, the first data processing means masks DMA request on the first bus, the second data processing means masks direct memory access request on the second bus, and the first and second data processing means directly access the buffer memory within the bus repeater under the same transfer condition as the first and second direct memory access control means on the respective buses.

Further, it is mentioned that the first data processing means masks DMA request on the second bus, and the first data processing means directly accesses the buffer memory within the bus repeater from the second bus side.

DMA transfer is carried out between memories or devices on respective buses and buffer memory of bus repeating means by respective DMA control means on the first and second buses, thereby making it possible to carry out DMA transfer between respective memories and devices on different buses through this buffer memory. At this time, data processing means (CPUs) on respective buses mask DMA requests on respective buses to directly access the buffer memory, thereby making it possible to check DMA function. Moreover, data processing means on the first bus masks DMA request on the second bus to access the buffer memory from the second bus side, thereby making it possible to check DMA function of the second bus.

Further, in order to solve the above-described problems, this invention is characterized in that first and second buses different from each other are connected through bus repeating means having a buffer memory to carry out data transfer between the first bus and the second bus through the buffer memory within the bus repeating means, and the bus repeating means adds dummy data at the time of data transfer to thereby enlarge size of transfer data block, or the bus repeating means omits a portion of data at the time of data transfer to thereby reduce size of transfer data block.

In this case, it is mentioned that data transfer control is carried out between the first bus and buffer memory within the bus repeating means by first direct memory access control means connected to the first bus and data transfer control is carried out between the second bus and buffer memory within the bus repeating means by second direct memory access control means connected to the second bus. Moreover, it is mentioned that the bus repeating means is operative so that even if data within the buffer memory is lost at the time of data transfer, it outputs dummy data when it is supplied with output request to thereby enlarge size of transfer data block, or when data within the buffer memory remains at the time point when data transfer of the output side has been completed at the time of data transfer, it abolishes the remaining data to thereby reduce size of transfer data block.

The bus repeater which intervenes transfer is caused to additionally have a function to enlarge or reduce block size of transfer data, thereby making it possible to carry out change of simple data configuration at the time of data transfer.

BRIEF DESCRIPTION OF THE DRAWINGS

FIG. 6 is a view showing more practical example of data train before transfer.

FIG. 7 is a view showing more practical example of data train obtained by omitting a portion in transfer.

FIG. 12 is a view showing more practical example of header added in FIG. 11.

BEST MODE FOR CARRYING OUT THE INVENTION

The embodiments according to this invention will now be described with reference to the attached drawings.

Figure 2:
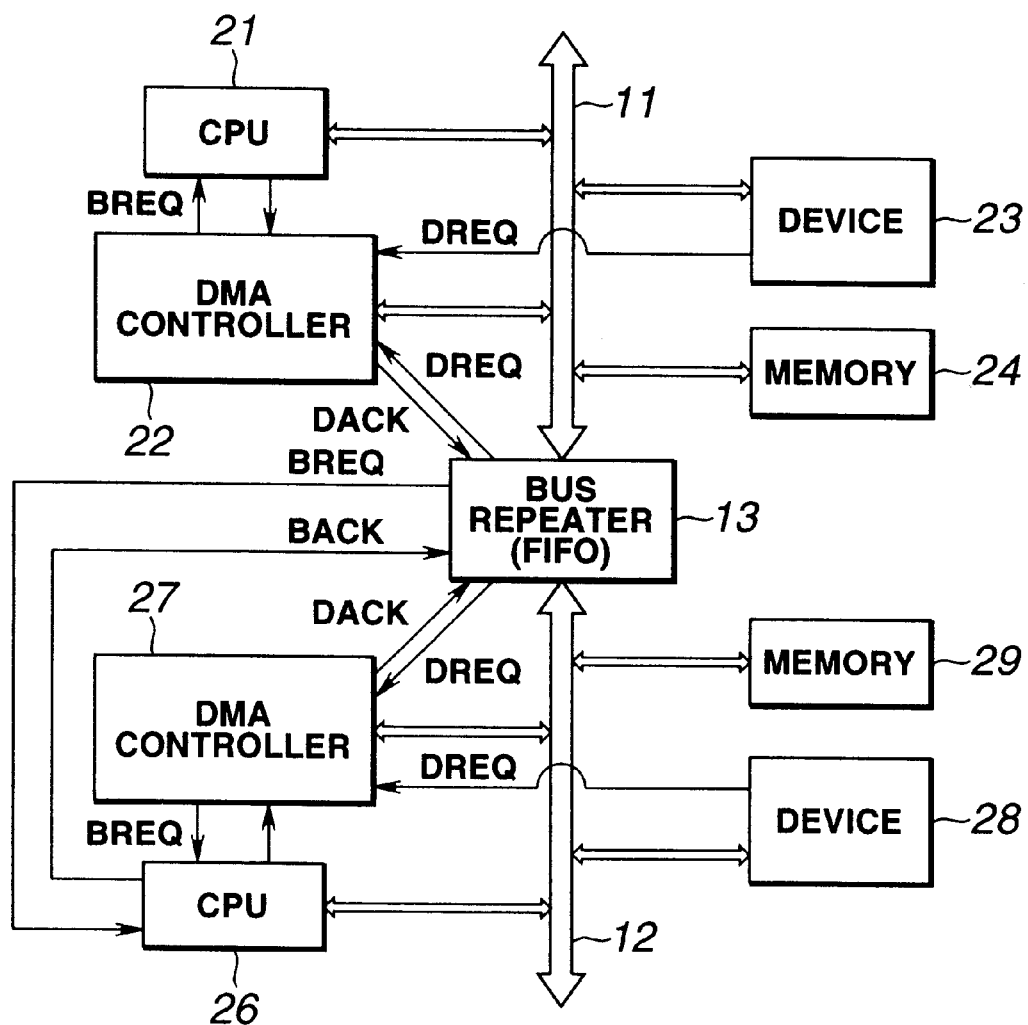
FIG. 2 is a block diagram showing outline of the configuration of an embodiment of this invention.

FIG. 2 is a block diagram showing system configuration to which a data transfer method which is the embodiment according to this invention is applied.

In this FIG. 2, both a first bus 11 and a second bus 12 are connected to a bus repeater 13 constituted by using buffer memory such as FIFO, etc., thus making it possible to carry out mutual transfer of data between the buses 11 and 12 through this bus repeater 13. A CPU 21, a DMA (Direct Memory Access) controller 22, a device 23 and a memory 24, etc. are connected to the first bus 11, and a CPU 26, a DMA controller 27, a device 28 and a memory 29, etc. are connected to the second bus 12.

The device 23 can issue DMA request with respect to the DMA controller 22 and the device 28 can issue DMA request with respect to the DMA controller 27. As these devices 23, 28, there can be mentioned, e.g., encoder/decoder for picture or speech, graphic engine for graphic processing, picture processing or speech processing IC, etc., hard disc units through respective interfaces therefor, magneto-optical disc unit, floppy disc unit, and/or peripheral equipment such as CD-ROM unit, etc. The bus repeater 13 can respectively issue DMA requests (DREQ) with respect to the DMA controllers 22, 27. By these DMA requests, it is possible to designate any one of plural DMA channels. In addition, the bus repeater 13 can, e.g., issue request of use right of bus 12 (BREQ: bus request) with respect to the CPU 26 on the bus 12 and receive (accept) response of bus use permission (BACK: Bus Acknowledge) from the CPU 26.

Figure 3:
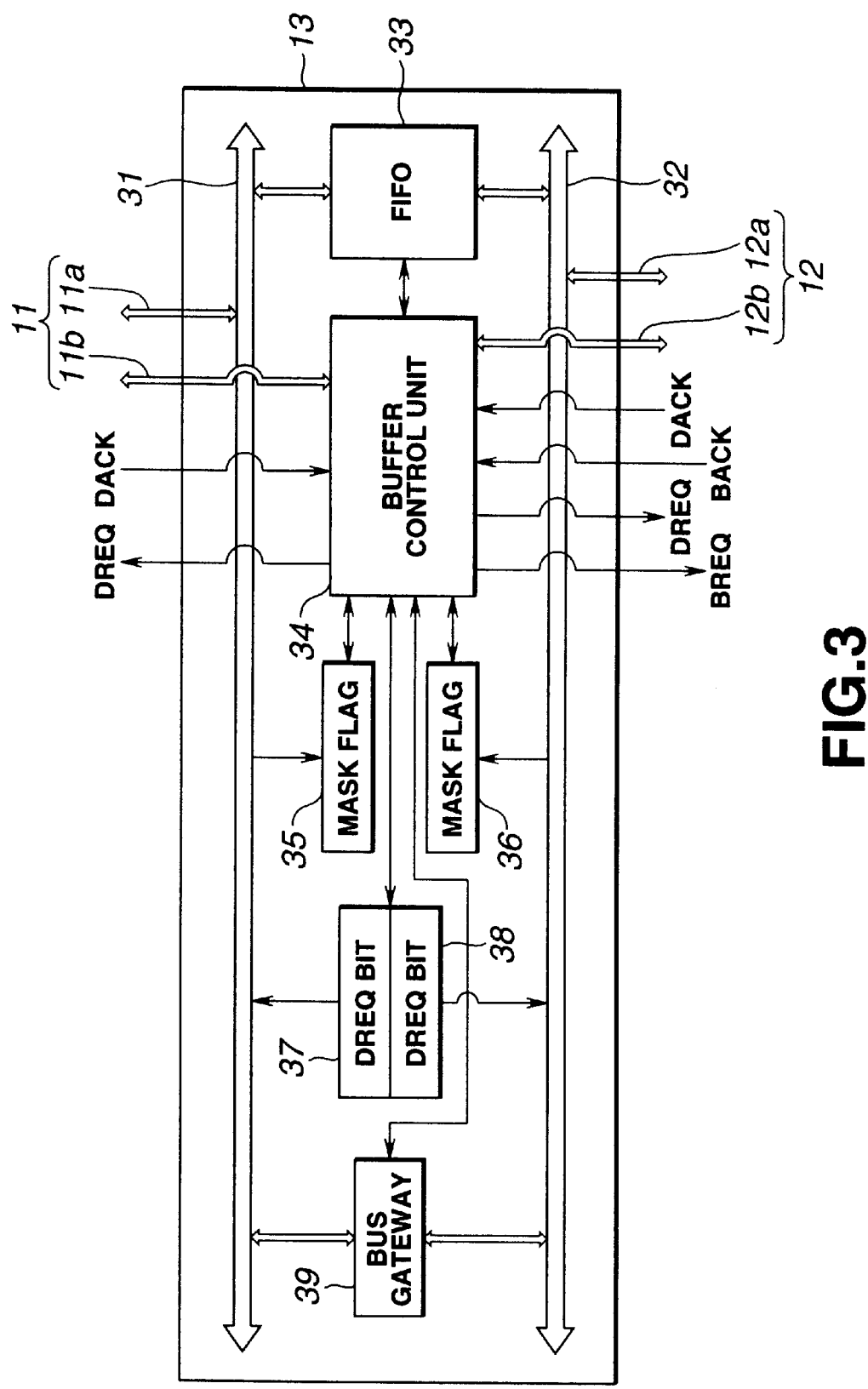
FIG. 3 is a block diagram showing an example of internal configuration of bus repeater used in embodiment of this invention.

An example of the configuration of bus repeater 13 used in such system of FIG. 2 is shown in FIG. 3. In this FIG. 3, the first bus 11 of FIG. 2 is indicated in the state separated into data bus 11a and address/control bus 11b, and the second bus 12 is indicated in the state separated into data bus 12a and address/control bus 12b. Within the bus repeater 13, there are provided internal bus 31 connected to the data bus 11a of the first bus 11 and internal bus 32 connected to the data bus 12a of the second bus 12. A FIFO (First In First Out) memory 33 is connected to these internal buses 31, 32. Further, a buffer control unit 34 may be connected to these internal buses 31, 32. The buffer control unit 34 is also connected to the address/control bus 11b of the first bus 11 and the address/control bus 12b of the second bus 12. In addition, control signal lines for carrying out DMA request (DREQ) or channel designation, etc. between the buffer control unit 34 and the DMA controllers 22, 27 of FIG. 2 are connected to the buffer control unit 34.

Mask flag 35 is flag for inhibiting DMA of the bus 11 side. When this flag is ON or "1" by control of the CPU 21 of FIG. 2, DMA request (DREQ) from the buffer control unit 34 to the DMA controller 22 of FIG. 2 is not outputted. Mask flag 36 is flag for inhibiting DMA of the bus 12 side. When this flag is ON or "1" by the CPU 26 of FIG. 2, DMA request (DREQ) from the buffer control unit 34 to the DMA controller 27 of FIG. 2 is not outputted.

DREQ bits 37 and 38 are flags respectively indicating ON/OFF (or "1"/"0") of DMA request with respect to respective buses 11 and 12, and these bits can be read from both the CPUs 21, 22. These flags of DREQ bits 37 and 38 are not masked even if the above-mentioned mask flags 35, 36 are ON, and the states of DMA requests which do not appear in DMA request (DREQ) to respective DMA controllers 22, 27 can be read by the respective CPUs 21, 26.

A bus gateway 39 serves to connect the internal buses 31 and 32 in order that the CPU 21 of the bus 11 side of FIG. 2 accesses the bus 12. These mask flags 35, 36, the DREQ bits 37, 38 and the bus gateway 39 are connected to the buffer control unit 34.

In the bus repeater 13 shown in FIG. 3, the FIFO memory 33 is memory serving as role of the buffer, and is adapted so that input/output of data is controlled with respect to the buses 11, 12 accessed by the buffer control unit 34, i.e., the internal buses 31, 32 connected thereto. The buffer control unit 34 controls the bus access operation of the FIFO memory 33, and issues DMA request (DREQ) with respect to the DMA controllers 22, 27 of the respective buses 11, 12 to receive (accept) its response (DACK: DMA Acknowledge). This DMA request can designate any one of plural DMA channels to output it. DMA channel select information from the DMA controllers 22, 27 are also sent to this buffer control unit 34.

Moreover, e.g., when the CPU 21 provides access to address of the bus 12, the buffer control unit 34 of the bus repeater 13 issues request of use right of the bus 12 (BREQ: bus request) with respect to the CPU 26 of the bus 12. The CPU 26 sends, to the buffer control unit 34 of the bus repeater 13, response to permit use of the bus 12 (BACK: Bus Acknowledge) in response to this bus request. Thereafter, the CPU 21 can access mask flag 36 of the internal bus 32 side of the bus repeater 13, the FIFO 33, and DMA controller 27, device 28 and memory 29 on the bus 12, etc.

Meanwhile, in the case where DMA transfer is carried out through the bus repeater 13 between the first bus 11 and the second bus 12, it is necessary that settings (e.g., data size, etc.) of DMA of DMA controllers 22 and 27 are caused to correspond to each other without inconsistency. The CPU 21 carries out setting of DMA on the bus with respect to the DMA controller 22 and the CPU 26 carries out setting of DMA on the bus with respect to the DMA controller 27.

In the case where, e.g., data transfer by DMA is carried out from the memory 24 of the first bus 11 to the memory 29 of the second bus 12, it is necessary that setting is made such that there are provided DMA channels caused to correspond to each other at the same data sizes (data quantities) with respect to DMA from the memory 24 to the bus repeater 13 in the DMA controller 22 of the first bus 11 and with respect to DMA from the bus repeater 13 to the memory 29 in the DMA controller 27 of the second bus 12. Processing procedure after these settings have been made is as shown in FIG. 4.

Figure 4:
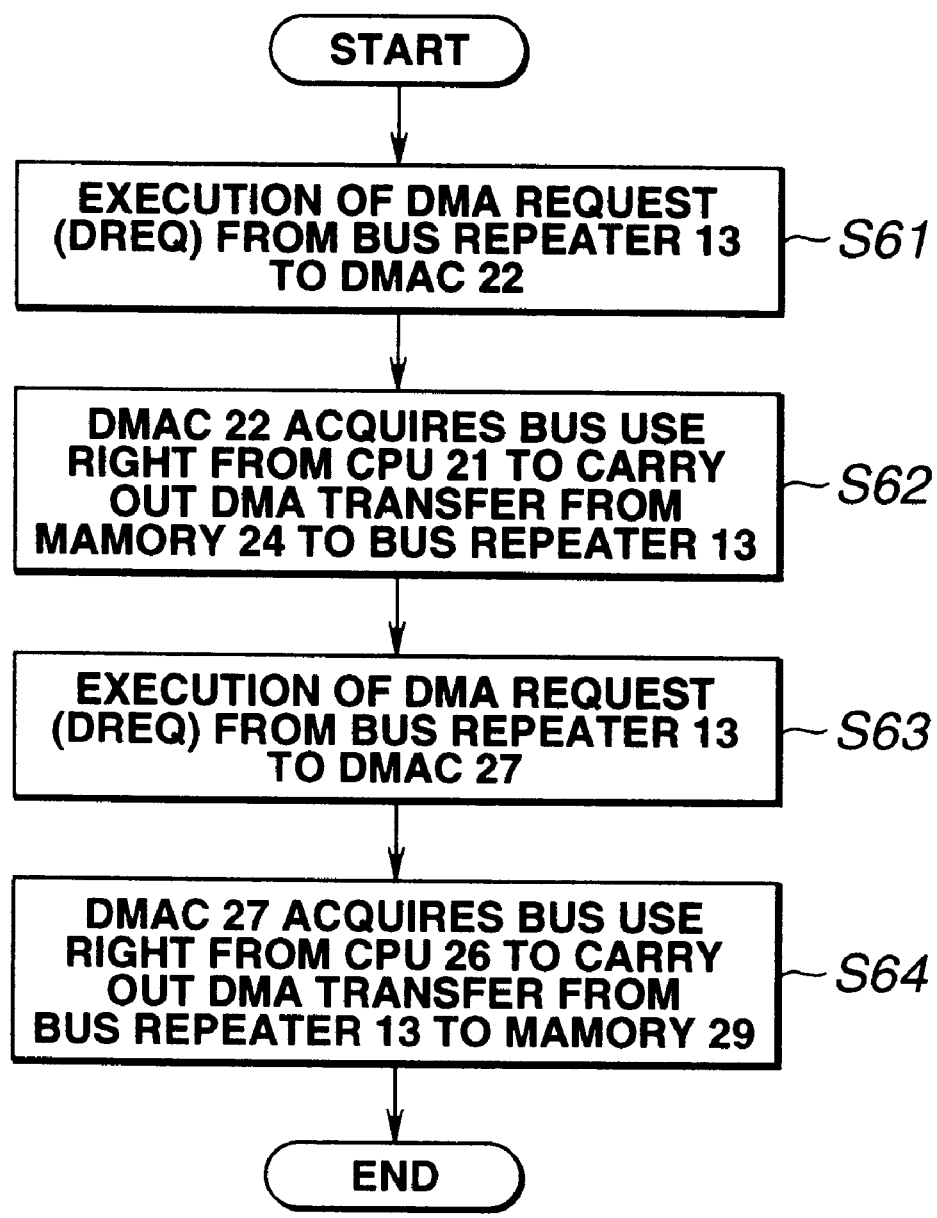
FIG. 4 is a flowchart for explaining an example of the operation of the embodiment of this invention.

In this FIG. 4, at first step S61, DMA request (DREQ) is carried out from the bus repeater 13 to the DMA controller 22. At the subsequent step S62, the DMA controller 22 makes a request for use right of bus 11 (BREQ) with respect to the CPU 21 to acquire bus use right to carry out DMA transfer from the memory 24 to the bus repeater 13. At the subsequent step S63, the bus repeater 13 carries out DMA request (DREQ) with respect to the DMA controller 27. At the subsequent step S64, the DMA controller 27 carries out request for use right of bus 12 (BREQ) with respect to the CPU 26 to acquire bus use right to carry out DMA transfer from the bus repeater 13 to the memory 29.

Moreover, in the case where DMA transfer of data is carried out from the device 28 on the second bus 12 to the device 23 on the first bus 11, it is necessary that setting is made such that there are provided DMA channels caused to correspond to each other at the same data sizes with respect to DMA from the device 28 to the bus repeater 13 in the DMA controller 27 and with respect to DMA from the bus repeater 13 to the device 23 in the DMA controller 22. Processing procedure after these settings have been made is as shown in FIG. 5.

Figure 5:
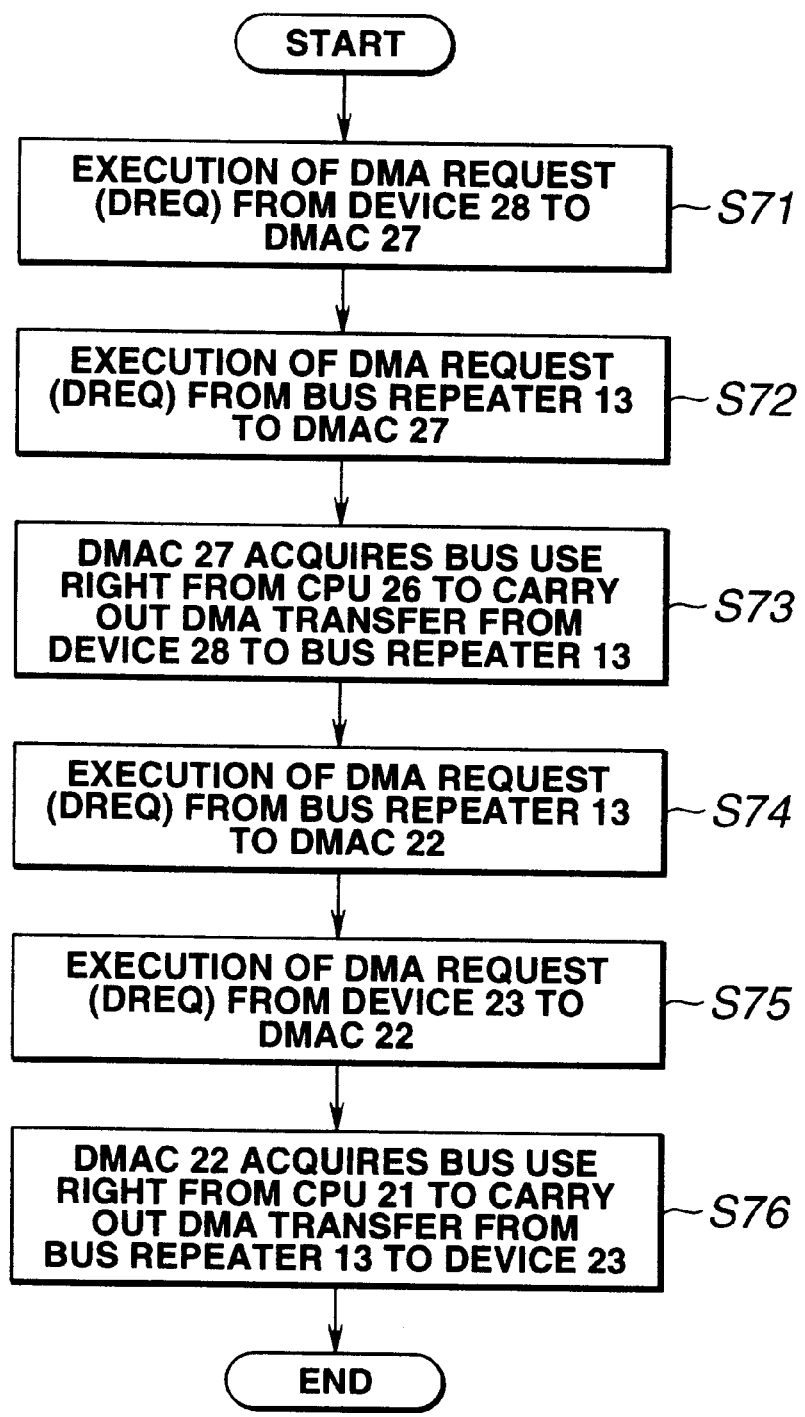
FIG. 5 is a flowchart for explaining another example of the operation of the embodiment of this invention.

At the first step S71 of FIG. 5, the device 28 on the second bus 12 carries out DMA request (DREQ) with respect to the DMA controller 27. At the subsequent step S72, the bus repeater 13 carries out DMA request (DREQ) with respect to the DMA controller 27. At step S73, the DMA controller 27 responds to reception of respective DMA requests from the device 28 and the bus repeater 13 to carry out request for use right of bus 12 (BREQ) with respect to the CPU 26 to acquire bus use right to carry out DMA transfer from the device 28 to the bus repeater 13. At this time, similarly to the normal DMA transfer, the CPU 26 sends, back to the DMA controller 27, response when it opens the bus in response to the bus request (BREQ), and the DMA controller 27 sends DMA acknowledge (DARK) back to the bus repeater 13, etc. At subsequent step S74, the bus repeater 13 carries out DMA request (DREQ) with respect to the DMA controller 22 on the first bus 11. At step S75, the device 23 carries out DMA request (DREQ) with respect to the DMA controller 22. At the subsequent step S76, the DMA controller 22 responds to reception of respective DMA requests from the device 23 and the bus repeater 13 to carry out request for use right of bus 11 (BREQ) with respect to the CPU 21 to acquire bus use right to carry out DMA transfer from the bus repeater 13 to the device 23.

It is to be noted that since capacity of memory such as FIFO, etc. of the bus repeater 13 is finite, in the case where data of size above that capacity is transferred, it is sufficient to make setting of divisional transfer with respect to the DMA controllers 22, 27 to repeat processing from the steps S61 to S64 or steps S71 to S76. One transfer (block) in this divisional transfer is determined by memory capacity of the bus repeater 13.

Accordingly, DMA transfer is caused to be carried out between two buses 11, 12 through buffer memory of the bus repeater 13, thereby making it possible to carry out DMA between different buses without allowing standby (wait) time to take place. Moreover, plural DMA channels are permitted to be operated at the same time to thereby simplify processing of CPU to realize simple programming and lesser overhead. Further, buffer of repeater between buses can be efficiently utilized. In addition, program of multi-sled can be written with ease.

Meanwhile, when, e.g., the CPU 21 accesses the bus 12, the bus repeater 13 makes a request for use right of bus 12 (BREQ) to the CPU 26 to receive (accept) its response (BACK) to access DMA controller 27, device 28 and memory 29, etc. on the bus 12.

At this time, the FIFO 33 of FIG. 3 is operative so that when outputs of DMA requests (DREQ) to respective DMA controllers 22, 27 are inhibited by mask flags 35, 36, I/O access operations can be made at respective buses 11, 12. In this case, such I/O access must be carried out equivalently without inconsistency with the processing of DMA. Accordingly, access cannot be made arbitrarily, but the I/O access is permitted under the same condition as access of DMA. An example of the condition of this I/O access is shown in the following Table 1.

In this case, as the condition for diagnosing DMA function, cases as described below are conceivable.

Condition #1: Data transfer is carried out by using DMA controllers 22, 27 along with buses 11, 12.

Condition #2: CPU 21 carries out transmission/reception of data by I/O access only on the bus 11 side.

Condition #3: CPU 26 carries out transmission/reception of data by I/O access only on the bus 12 side.

Condition #4: CPUs 21, 26 carry out transmission/reception of data by I/O access on both the bus 11 and the bus 12 sides.

Condition #5: In the state where device on the bus 12 side does not exist or device of the bus 12 side is not used, data transfer is carried out by DMA by the DMA controller 22 on the bus 11 side, and the CPU 21 carries out data transfer by I/O access on the bus 12 side.

Condition #6: In the state where device on the bus 12 side dose not exist or device of the bus 12 side is not used, CPU 21 carries out data transfer by I/O access both on the buses 11 and 12 sides.

It is to be noted that it is deemed that diagnosis of DMA function is carried out in reverse order from the condition #6 as order of actual debugging.

By carrying out data transfer by procedure as described below under the above-described respective conditions #1 to #6 to examine under what condition problem takes place, it is possible to specify imperfect function unit or function unit of the question.

Condition #1
Mask flag 35: off, Mask flag 36: off
Transfer direction: *
   CPU 21: Instruction of transfer to DMAC 22
   CPU 26: Instruction of transfer to DMAC 27
Condition #2
Mask flag 35: on, Mask flag 36: off
Transfer direction: bus 11→bus 12
   CPU 26: Instruction of transfer to DMAC 27
   CPU 21: Waiting for on of DREQ bit 37 to write data into bus repeater 13.
Transfer direction: bus 12→bus 11
   CPU 26: Instruction of transfer to DMAC 27
   CPU 21: Waiting for on of DREQ bit 37 to read data from bus repeater 13.
Condition #3
Mask flag 35: off, Mask flag 36: on
Transfer direction: Bus 11→Bus 12
   CPU 21: Instruction of transfer to DMAC 22
   CPU 26: Waiting for on of DREQ bit 38 to read data from bus repeater 13
Transfer direction: Bus 12→Bus 11
   CPU 21: Instruction of transfer to DMAC 22

TABLE 1

| STATE OF SIGNAL & FLAG | | | | | TRANSFER | 21 ACCESS | | 22 ACCESS | |
|---|---|---|---|---|---|---|---|---|---|
| 37 | 38 | 35 | 36 | BACK | DIRECTION | READ | WRITE | READ | WRITE |
| 0 | 0 | * | * | * | * | X | X | X | X |
| 1 | 0 | 0 | * | * | * | X | X | X | X |
| 1 | 0 | 1 | * | * | 12 → 11 | ○ | X | X | X |
| 1 | 0 | 1 | * | * | 11 → 12 | X | ○ | X | X |
| 0 | 1 | * | 0 | * | * | X | X | X | X |
| 0 | 1 | * | 1 | 0 | 12 → 11 | X | X | ○ | X |
| 0 | 1 | * | 1 | 0 | 11 → 12 | X | X | X | ○ |
| 0 | 1 | * | 1 | 1 | 12 → 11 | ○ | X | X | X |
| 0 | 1 | * | 1 | 1 | 11 → 12 | X | ○ | X | X |

"*" of the column of "state of signal and flag" of this Table 1 represents arbitrary (Don't care) state.

CPU 26: Waiting for on of DREQ bit 38 to write data into bus repeater 13.
Condition #4
Mask flag 35: on, Mask flag 36: on
Transfer direction: Bus 11→Bus 12
    CPU 21: Waiting for on of DREQ bit 37 to write data into bus repeater 13.
    CPU 26: Waiting for on of DREQ bit 38 to read data from bus repeater 13.
Transfer direction: Bus 12→Bus 11
    CPU 26: Waiting for on of DREQ bit 38 to write data into bus repeater 13.
    CPU 21: Waiting for on of DREQ bit 37 to read data from bus repeater 13.
Condition #5
Mask flag 35: off, Mask flag 36: on
Transfer direction: Bus 11→Bus 12
  CPU 21: Instruction of transfer to DMAC 22
    : Waiting for on of DREQ bit 38 to read data from bus repeater 13.
Transfer direction: Bus 12→Bus 11
  CPU 21: Instruction of transfer to DMAC 22
    : Waiting for on of DREQ bit 38 to write data into bus repeater 13.
Condition #6
Mask flag 35: on, Mask flag 36: on
Transfer direction: Bus 11→Bus 12
    CPU 21: Waiting for on of DREQ bit 37 to write data into bus repeater 13.
    : Waiting for on of DREQ bit 38 to read data from bus repeater 13.
Transfer direction; Bus 12→Bus 11
    CPU 21: Waiting for on of DREQ bit 38 to write data into bus repeater 13
    : Waiting for on of DREQ bit 37 to read data from bus repeater 13.

By confirming in what condition of these six kinds of conditions extraordinary state takes place, diagnosis of fault portion or problem point is carried out. In this case, data transferred onto the bus 12 can be confirmed by test program of CPU 21 by allowing the CPU 21 to directly access the bus 12.

Accordingly, in accordance with such embodiment of this invention, it is possible to easily debug DMA transfer function between different buses 11, 12 thus to specify the portion of the question. Moreover, only by the CPU 21 on the bus 11 serving as main, function confirmation can be carried out. Further, by directly providing access to the other bus 12, debugging except for DMA function can be also carried out.

Summarizing the above-described description, in accordance with the embodiment of this invention, bus repeating means having buffer memory is provided between the first bus and the second bus, and first direct memory access (DMA) control means is connected to the first bus and second direct memory access control means is connected to the second bus to carry out, through the buffer memory, direct memory access transfer between memory or device connected to the first bus and memory or device connected to the second bus by these first and second direct memory access control means, and to mask, by data processing means (CPU), direct memory access request to the first or second direct memory access control means from the bus repeating means to directly access the buffer memory within the bus repeating means by the data processing means, whereby direct memory access transfer between respective memories or devices on different buses is carried out through this buffer memory. At this time, data processing means (CPUs) on respective buses mask direct memory access requests on respective buses to directly access the buffer memory, thereby making it possible to check direct memory access function. Moreover, data processing means on the first bus masks direct memory access request on the second bus to access the buffer memory from the second bus side, thereby making it possible to check direct memory access function of the second bus.

Accordingly, it is possible to easily debug direct memory access transfer function between different buses to specify the portion of the question. Moreover, only by data processing means on the main bus, the function confirmation can be carried out. Further, by directly providing access to the other bus, debugging except for direct memory access function can be also carried out.

Explanation will now be given in connection with the example where block size of transfer data of the system for carrying out DMA transfer through buffer between different buses can be changed with ease.

In this example, the bus repeater 13 adds dummy data at the time of transfer, or omits a portion of data to thereby change block size.

Namely, in the case where continuous data train from transfer source are all written into the transfer destination as they are in DMA transfer as explained along with the above-mentioned FIGS. 2 to 5, setting is made such that one transfer unit (block) is size of FIFO 33 within the bus repeater 13 along with DMA controllers 22, 27 so that most efficient transfer can be carried out.

In the case where quantity of data inputted to the buffer (FIFO 33) and quantity of data outputted therefrom are different from each other, the bus repeater 13 has a function to carry out processing as described below.

Namely, first, in the case where even if inputted data is lost from the buffer (FIFO 33), output request is further issued, the bus repeater 13 outputs dummy data.

Secondly, in the case where inputted data is left in the buffer (FIFO 33) at the time point when DMA of the output side has been completed, left data is abolished.

By the function of such bus repeater 13, it is possible to vary configuration of data train to be transferred. As change of the configuration of this data train, it is mentioned that dummy data is supplemented at the time of DMA transfer to thereby enlarge size of data block, and a portion of data is omitted at the time of DMA transfer to thereby reduce size of data block.

A more practical example in the case where capacity of the buffer (FIFO 33) of the bus repeater 13 is 64 bytes will now be described.

Figure 1:
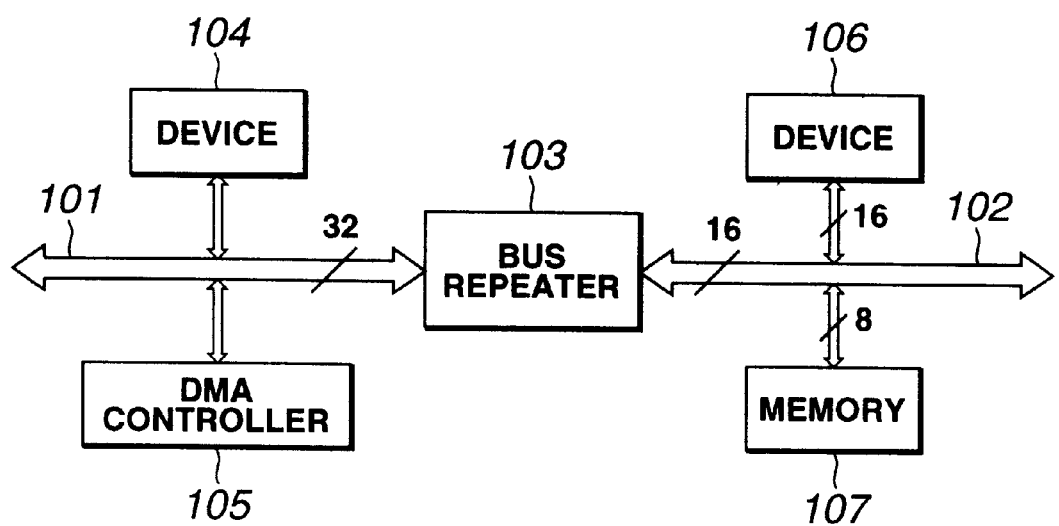
FIG. 1 is a block diagram showing a conventional example of system using two buses.

For example, it is assumed that data trains $S_{1A}$, $S_{1B}$, $S_{1C}$, $S_{2A}$, . . . as shown in FIG. 6 are developed in the memory 29 of FIG. 2. A, B, C of subscripts of these data trains $S_{1A}$, $S_{1B}$, $S_{1C}$, $S_{2A}$, . . . represent data different from each other in kind, and the case where only data of kinds of B, C of these three kinds of data are transferred to the device 23 of FIG. 2 is assumed. At this time, it is necessary to write data trains as shown in FIG. 7 into the device 23. In this case, FIGS. 1, 2, 3 . . . of subscripts of data trains $S_{1A}$, $S_{1B}$, $S_{1C}$, $S_{2A}$, . . . show numbers of data blocks which are respective one transfer units.

In the DMA controller 27, there is carried out setting of such DMA transfer to transfer three blocks from data train $S_{1B}$ with all kinds (A, B, C) of the data $S_{1A}$, $S_{1B}$, $S_{1C}$, $S_{2A}$, . . . , i.e., 32 bytes being as one block. On the contrary, in the DMA controller 22, setting is made so as to transfer three blocks with only two kinds of B, C, i.e., 24 bytes being as 1 block. Thus, 8 bytes (data trains $S_{2A}$, $S_{3A}$) subsequent to data trains ($S_{1C}$, $S_{2C}$) of kind C are abolished. For this reason, data trains as shown in FIG. 7 can be resultantly written into the device 23.

Figures 8, 9:
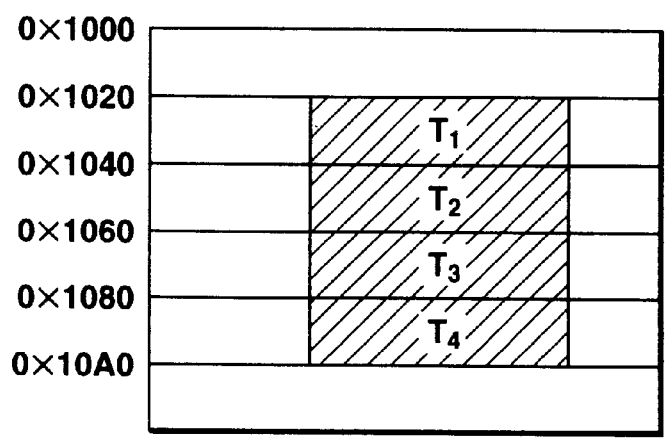
FIG. 8 is a view showing more practical example of data train obtained by supplementing another data in transfer.
FIG. 9 is a view showing one example of data area to be transferred on texture picture.

Then, let suppose the case where attempt is made to output data trains of the format as shown in FIG. 7 from the device 23 of FIG. 2 to develop such data trains into, e.g., the memory 29, and to insert data train of kind D after data trains of the kind C as shown in FIG. 8.

In this case, in the DMA controller 27, setting is made so as to transfer 3 blocks with the 36 bytes being as one block. At this time, as the result of DMA transfer, dummy data of 12 bytes are written into the portion after data train of 24 bytes of the kinds B, C. For this reason, the CPU 26 of FIG. 2 can directly write data train of the kind D into this dummy data area. Namely, the CPU 26 can save labor for shifting data on the memory 29.

It is to be noted that in such cases that e.g., the device 28 of FIG. 2 outputs data trains as shown in FIG. 8 to write data trains of only kinds of B, C thereof into the device 23, it is sufficient to make setting in the DMA controller 27 to transfer 3 blocks with 36 bytes from the beginning of data train being as 1 block, and it is sufficient in the DMA controller 27 to transfer three blocks with 24 bytes being as 1 block.

By causing the bus repeater 13 which intervenes transfer to additionally have the above-described function, it is possible to carry out conversion of simple data configuration at the time of transfer of data train, thus making it possible to improve performance of the system.

Explanation will now be given with reference to the attached drawings in connection with more practical example where extra data as described above is rounded down or another data is inserted into the portion between data trains.

Figure 10:
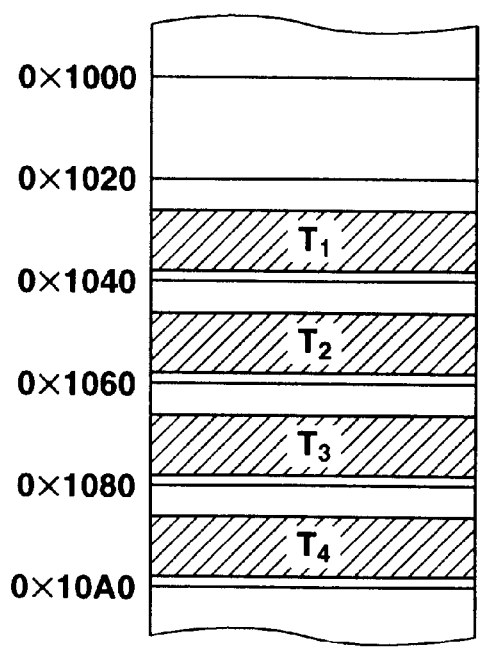
FIG. 10 is a view showing data arrangement on memory of FIG. 9.

FIG. 9 shows texture picture area for texture mapping in picture processing such as computer graphics, etc., and it is assumed that a portion within broad texture area, e.g., areas $T_1$, $T_2$, $T_3$, $T_4$ indicated by slanting line portions in the figure are transferred. This texture picture is developed as shown in FIG. 10, for example, on the memory, and it is required that when data of partial areas $T_1$, $T_2$, $T_3$, $T_4$ on this memory are transferred, extra data is rounded out.

Figure 11:
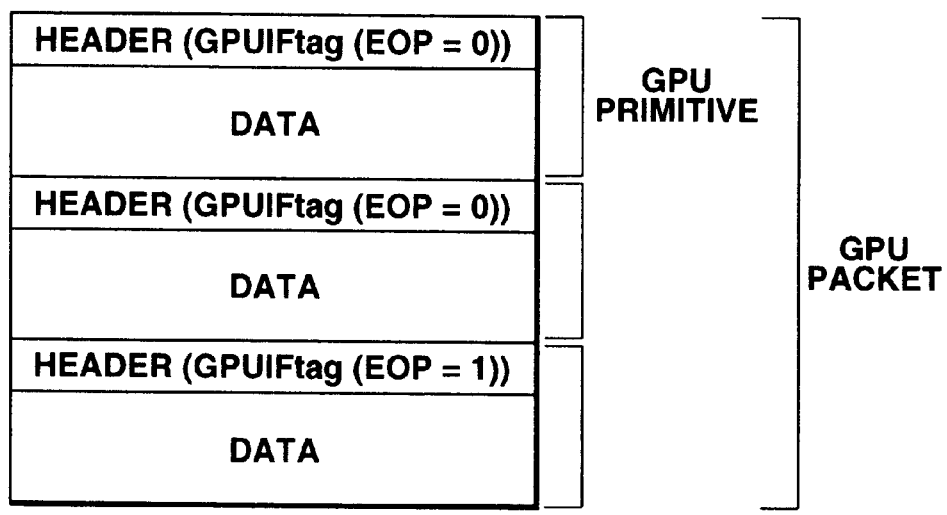
FIG. 11 is a view showing one example in which headers are respectively added to several data trains.

Moreover, as example of data addition, the case where headers are respectively added to several data trains as shown in FIG. 11, e.g., polygon data is mentioned. Namely, with respect to polygon data, size of data train changes in dependency upon the number of vertices, or presence/absence of shading or texture, etc. Moreover, for the purpose of distinction from texture data or distinction of transfer destination, there are instances where header (GPUIFtag) is attached. Data transferred by interface GPUIF of GPU (Graphic processor unit) is such that a set of data called primitive constituted by the leading header (GPUIFtag) and subsequent data are caused to be fundamental unit, and plural primitives processed in a bundle are caused to be collectively GPU packet. FIG. 12 shows an example of the configuration of the header (GPUIFtag), and is composed of register descriptor REGS, register descriptor number NREG, and data form FLG, etc. in order from MSB. In the case where header (GPUIFtag) is added to polygon data as stated above, it is necessary to insert another data into the portion between data trains.

In the case where conversion of simple data configuration as stated above is required, the above-described embodiment of this invention is used, thereby making it possible to omit poor efficient work in which CPU carries out sequencing of data train DMA-transferred onto the memory or data train to be DMA-transferred onto the memory. Thus, performance of the system is improved. Moreover, it is possible to carry out DMA transfer between devices of different data formats. Further, work for preparing transfer source address of special specification or table of transfer quantity, or making reference to table can be omitted.

As apparent from the above explanation, in accordance with the example which has been explained along with FIGS. 6 to 11 of the embodiment of this invention, bus repeating means having buffer memory is provided between the first bus and the second bus to carry out, through buffer memory within bus repeating means, data transfer between the first bus and the second bus. The bus repeating means adds dummy data at the time of data transfer to thereby enlarge size of transfer data block, or to omit a portion of data at the time of data transfer to thereby reduce size of transfer data block, thereby making it possible to carry out change of simple data configuration at the time of transfer. Thus, performance of the system can be improved.

Moreover, first direct memory access control means is connected to the first bus to carry out data transfer control between the first bus and buffer memory within the bus repeating means, and second direct memory access control means is connected to the second bus to carry out data transfer control between the second bus and buffer memory within the bus repeating means. The bus repeating means is caused to have a function to output dummy data when output request is issued even if data within the buffer memory is lost at the time of data transfer and a function to abolish remaining data when data within the buffer memory remains at the time point when data transfer of the output side has been completed at the time of data transfer. Thus, poor efficient work such that CPU, etc. carries out sequencing processing of data on the memory which has been caused to undergo data transfer or which is to be caused to undergo data transfer can be omitted. Further, labor for preparing or making reference to transfer source address for data transfer or special transfer specification table of transfer quantity, etc. can be omitted. In addition, it is possible to carry out data transfer between devices of different data formats.

Figure 13:
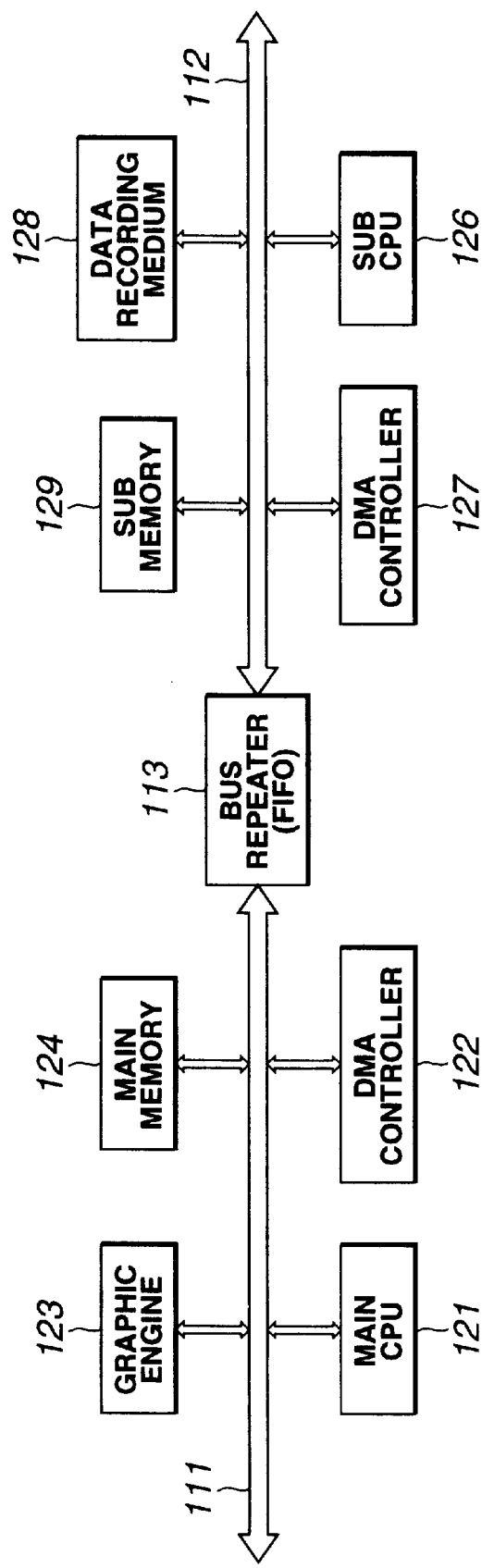
FIG. 13 is a block diagram showing one example of system to which the embodiment of this invention is applied.

FIG. 13 shows an example of the system to which the embodiment of this invention as described above is applied. In this system, a main bus 111 for carrying out high speed picture processing and a sub bus 112 to which low speed peripheral devices such as CD-ROM drive, etc. are connected are connected through a bus repeater 113 having buffer memory such as FIFO, etc.

Namely, in FIG. 13, a main CPU 121, a DMA controller 122, a graphic engine 123 for high speed picture processing and a main memory 124 are connected to the high speed main bus 111, and a sub CPU 126, a DMA controller 127, a data recording medium 128 such as CD-ROM, etc. and a sub memory 129 are connected to the relatively low speed sub bus 122. These main bus 111 and sub bus 112 are connected through the bus repeater 113 having buffer memory such as FIFO, etc. as described above, and this bus repeater 113 can issue plural kinds of DMA requests corresponding to plural DMA channels, e.g., three kinds of DMA requests. Since it is sufficient that more practical configuration and operation of this bus repeater 113 are caused to be similar to the bus repeater 13 of the embodiment which has been described with reference to FIGS. 2 to 5, its explanation is omitted.

In the case where DMA transfer is carried out between the high speed bus and the low speed bus as stated above, data transfer can be carried out without allowing useless standby time to take place on high speed bus, and processing by CPU can be simplified. In addition, it is possible to easily carry out debugging of DMA transfer function between different buses.

It is to be noted that this invention is not limited to the embodiments. While explanation has been given in connection with the example where bidirectional DMA transfer is carried out between the first bus and the second bus, this invention can be also applied to the case where only DMA transfer from the first bus to the second bus, or only DMA transfer from the second bus to the first bus is carried out. In addition, it is a matter of course that the number of DMA channels and/or circuits connected to respective buses, etc. are not limited to those of the embodiments.

What is claimed is:

1. A data transfer method comprising the steps of:

connecting a first bus and a second bus which are different from each other through bus repeating means having a buffer memory;

carrying out data transfer control between the first bus and the buffer memory within the bus repeating means by first direct memory access control means connected to the first bus;

carrying out data transfer control between the second bus and the buffer memory within the bus repeating means by second direct memory access control means connected to the second bus; and masking, by data processing means, direct memory access request to the first or second direct memory access control means from the bus repeating means to directly access the buffer memory within the bus repeating means by the data processing means.

2. A data transfer method as set forth in claim 1, wherein first data processing means is provided on the first bus as the data processing means and second data processing means is provided on the second bus as the data processing means, wherein the first data processing means masks direct memory access request on the first bus, wherein the second data processing means masks direct memory access request on the second bus, and wherein the first and second data processing means directly access the buffer memory within the bus repeater under the same transfer condition as the first and second direct memory access control means on the respective buses.

3. A data transfer method as set forth in claim 1, wherein first data processing means is provided on the first bus as the data processing means, wherein the first data processing means masks direct memory access request on the second bus, and wherein the first data processing means directly accesses the buffer memory within the bus repeater from the second bus side.

4. A data transfer apparatus comprising:

a first bus and a second bus;

bus repeating means having a buffer memory connected to both the first and second buses;

first direct memory access control means connected to the first bus; and first data processing means connected to the first bus, wherein the bus repeating means has a function to issue direct memory access request to the first direct memory access control means, and a function to mask, by the first data processing means, this direct memory access request, to mask direct memory access request of the bus repeating means by the first data processing means to directly access the buffer memory within the bus repeating means.

5. A data transfer apparatus as set forth in claim 4, wherein second direct memory access control means and second data processing means are connected to the second bus, wherein the first and second direct memory access control means carry out read/write operation of data with respect to the buffer memory within the bus repeating means to thereby carry out data transfer between the first and second buses, and wherein the bus repeating means has a function to issue direct memory access request with respect to the second direct memory access control means and a function to mask, by the second data processing means, this direct memory access request, to mask direct memory access request of the bus repeating means by the second data processing means to directly access the buffer memory within the bus repeating means.

6. A data transfer apparatus as set forth in claim 5, wherein direct memory access request on the other bus in the bus repeater is masked by one of the first and second data processing means to access the buffer memory within the bus repeater from the other bus.

* * * * *

UNITED STATES PATENT AND TRADEMARK OFFICE
CERTIFICATE OF CORRECTION

PATENT NO. : 6,282,588 B1 Page 1 of 1
DATED : August 28, 2001
INVENTOR(S) : Yasuyuki Yamamoto It is certified that error appears in the above-identified patent and that said Letters Patent is hereby corrected as shown below:

<u>Title page, Item [54], and Column 1, line 1,</u>
Change the title to read, -- SYSTEM FOR MASKING DMA REQUEST FROM A BUS REPEATING MEANS TO A FIRST DMA IN A FIRST BUS OR SECOND DMA IN A SECOND BUS --.

Under "U.S. PATENT DOCUMENTS", add -- 5,664,223  9/1997  Bender, et al. --.

Under "FOREIGN PATENT DOCUMENTS", add
--      5-173933 A     7/1993          Japan,
        5-128049 A     5/1993          Japan,
        6-348644 A     12/1994         Japan   --.

In "ABSTRACT",
Lines 6 and 7, change "1,6", to read -- 21, 26 --.

Signed and Sealed this

Eighteenth Day of June, 2002

Attest:

JAMES E. ROGAN
Attesting Officer          Director of the United States Patent and Trademark Office